US009099270B2

(12) United States Patent
Zulkowski

(10) Patent No.: US 9,099,270 B2
(45) Date of Patent: Aug. 4, 2015

(54) POLE MOUNTED FUSE CUTOUT INDICATOR

(75) Inventor: Terry L. Zulkowski, Needville, TX (US)

(73) Assignee: TLZ Creative Solutions LLC, Needville, TX (US)

( * ) Notice: Subject to any disclaimer, the term of this patent is extended or adjusted under 35 U.S.C. 154(b) by 541 days.

(21) Appl. No.: 13/367,723

(22) Filed: Feb. 7, 2012

(65) Prior Publication Data

US 2012/0299739 A1 Nov. 29, 2012

Related U.S. Application Data

(60) Provisional application No. 61/488,941, filed on May 23, 2011, provisional application No. 61/490,339, filed on May 26, 2011.

(51) Int. Cl.

| | |
|---|---|
| ***G08B 3/00*** | (2006.01) |
| ***H02B 1/04*** | (2006.01) |
| ***H01H 85/32*** | (2006.01) |
| ***H01H 31/12*** | (2006.01) |

(52) U.S. Cl.
CPC ............ *H01H 85/32* (2013.01); *H01H 31/127* (2013.01)

(58) Field of Classification Search
CPC ..... H02H 3/046; H02H 3/083; H01H 31/127; H01H 85/32; H01H 1/00; H01H 2203/00; H01H 69/00; G08B 1/08; G08B 13/1427; G08B 13/2482; G08B 25/10; G08B 29/181; G08B 5/36; H04M 1/745; H04M 3/18; H04M 11/04; H04Q 1/30
See application file for complete search history.

(56) References Cited

U.S. PATENT DOCUMENTS

| | | | | |
|---|---|---|---|---|
| 1,970,007 A | | 8/1934 | James | |
| 3,849,759 A | * | 11/1974 | Hosaka et al. | 340/438 |
| 4,249,170 A | | 2/1981 | Cham et al. | |
| 4,307,369 A | | 12/1981 | Jackson, Jr. | |
| 4,514,723 A | | 4/1985 | Leal | |
| 4,616,207 A | | 10/1986 | Knapp, Jr. et al. | |
| 4,661,807 A | | 4/1987 | Panaro | |
| 4,897,873 A | | 1/1990 | Beutler et al. | |
| 5,343,192 A | * | 8/1994 | Yenisey | 340/639 |
| 5,973,418 A | * | 10/1999 | Ciesielka et al. | 307/130 |
| 5,986,558 A | * | 11/1999 | Crawford et al. | 340/638 |
| 6,144,284 A | * | 11/2000 | Santa Cruz et al. | 337/242 |
| 6,392,526 B1 | | 5/2002 | Roberts et al. | |

(Continued)

FOREIGN PATENT DOCUMENTS

| | | |
|---|---|---|
| DE | 102004004674 | 9/2005 |
| GB | 1411258 A | 10/1975 |

(Continued)

OTHER PUBLICATIONS

International Search Report and Written Opinion dated Aug. 9, 2012, International Application No. PCT/US2012/039110.

(Continued)

*Primary Examiner* — George Bugg
*Assistant Examiner* — Renee Dorsey
(74) *Attorney, Agent, or Firm* — Patterson & Sheridan, L.L.P.

(57) ABSTRACT

A fuse cutout indicator includes: a battery pack; an alarm; and a power controller. The power controller has a contactless power sensor for communication with a fuse, and is operable to connect the alarm to the battery pack in response to cessation of current through or voltage across the fuse.

10 Claims, 4 Drawing Sheets

(56) References Cited

U.S. PATENT DOCUMENTS

| | | | | |
|---|---|---|---|---|
| 7,109,877 | B2 | 9/2006 | Cuk | |
| 7,332,994 | B2 | 2/2008 | Hakes et al. | |
| 8,237,578 | B2 * | 8/2012 | Coffey et al. | 340/638 |
| 8,344,844 | B2 * | 1/2013 | Darr | 337/206 |
| 2002/0008628 | A1 * | 1/2002 | Sadjadi | 340/638 |
| 2002/0149464 | A1 | 10/2002 | Santa Cruz et al. | |
| 2002/0175800 | A1 | 11/2002 | Stanek et al. | |
| 2002/0175823 | A1 * | 11/2002 | Stanek | 340/639 |
| 2003/0222753 | A1 | 12/2003 | Lin | |
| 2004/0036619 | A1 * | 2/2004 | Berst et al. | 340/635 |
| 2004/0257191 | A1 | 12/2004 | Muller | |
| 2005/0024218 | A1 * | 2/2005 | Cuk | 340/638 |
| 2005/0094357 | A1 | 5/2005 | Ewing et al. | |
| 2005/0219033 | A1 | 10/2005 | Bortolloni et al. | |
| 2005/0248897 | A1 | 11/2005 | Sadjadi | |
| 2006/0017540 | A1 | 1/2006 | Smith | |
| 2006/0220892 | A1 | 10/2006 | May | |
| 2006/0226972 | A1 * | 10/2006 | Smith | 340/539.1 |
| 2010/0271045 | A1 * | 10/2010 | Oka et al. | 324/550 |
| 2011/0050413 | A1 * | 3/2011 | Wang | 340/540 |
| 2011/0050439 | A1 * | 3/2011 | Wang | 340/654 |
| 2011/0140902 | A1 * | 6/2011 | Huss et al. | 340/638 |

FOREIGN PATENT DOCUMENTS

| | | | |
|---|---|---|---|
| RU | 2085049 | * | 7/1997 |
| RU | 57423 | * | 10/2006 |
| SU | 513651 | * | 5/1976 |
| SU | 1105958 | * | 7/1984 |
| SU | 1274024 | * | 11/1986 |
| SU | 1644296 | * | 4/1991 |

OTHER PUBLICATIONS

PowerStream Technologies Webpage regarding “Digital DC Clamp on Ammeters,” Jan. 30, 2012, 4 pages.

Accurate Controls CRS Inc. Brochure regarding “Fire Fly: Fuse Cutout Indicator (FCI),” date unknown, 1 page.

Trek, Inc. Brochure regarding “Model 341B: High-Speed, High-Voltage Electrostatic Voltmeter,” 2010, 2 pages.

* cited by examiner

POLE MOUNTED FUSE CUTOUT INDICATOR

CROSS-REFERENCE TO RELATED APPLICATIONS

This application claims benefit of U.S. Provisional App. No. 61/488,941, filed May 23, 2011 and U.S. Provisional App. No. 61/490,339, filed May 26, 2011, both of which are hereby incorporated by reference in their entireties.

BACKGROUND OF THE INVENTION

1. Field of the Invention

Embodiments of the present invention generally relate to a pole mounted fuse cutout indicator.

2. Description of the Related Art

The primary purpose of a fuse cutout is to provide protection for power distribution systems and the various apparatus on those power lines such as transformers and capacitor banks. An over current in the system can occur under various conditions, such as an animal or tree contacting the power lines or more than one power line contacting each other. The fuse cutout acts to interrupt the current, and then the fuseholder of the cutout "drops out", thereby preventing the voltage from being impressed across the fuseholder and providing a visual indication of operation to the utility line crew.

A prior art fuse cutout is discussed and illustrated in U.S. Pat. No. 6,392,526, which is herein incorporated by reference in its entirety.

SUMMARY OF THE INVENTION

Embodiments of the present invention generally relate to a pole mounted fuse cutout indicator. In one embodiment, a fuse cutout indicator includes: a battery pack; an alarm; and a power controller. The power controller has a contactless power sensor for communication with a fuse, and is operable to connect the alarm to the battery pack in response to cessation of current through or voltage across the fuse.

In another embodiment, a fuse cutout indicator includes: a battery pack; an alarm; and a power controller. The power controller has a wireless power coupling for communication with a fuse, and is operable connect the alarm to the battery pack in response to cessation of current through or voltage across the fuse. The fuse cutout indicator further includes: a power converter operable to receive electricity from the wireless power coupling and supply low voltage direct current to the battery charger; and a battery charger operable to maintain charge of the battery pack.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
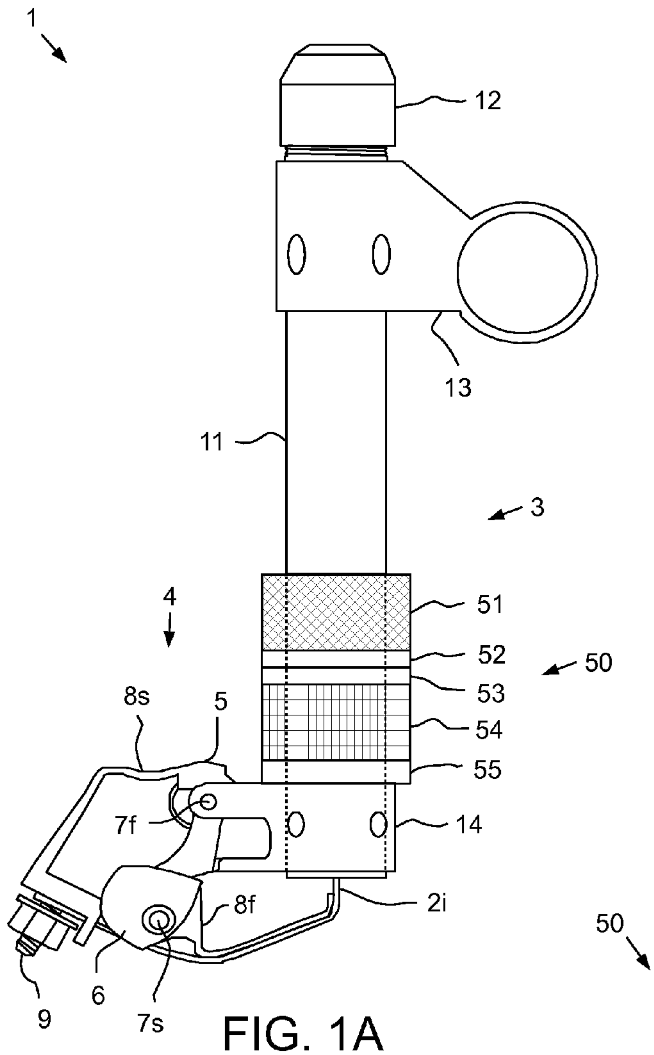
FIG. 1A is an external view of a fuseholder assembly in a closed position, according to one embodiment of the present invention.
Figure 1B:
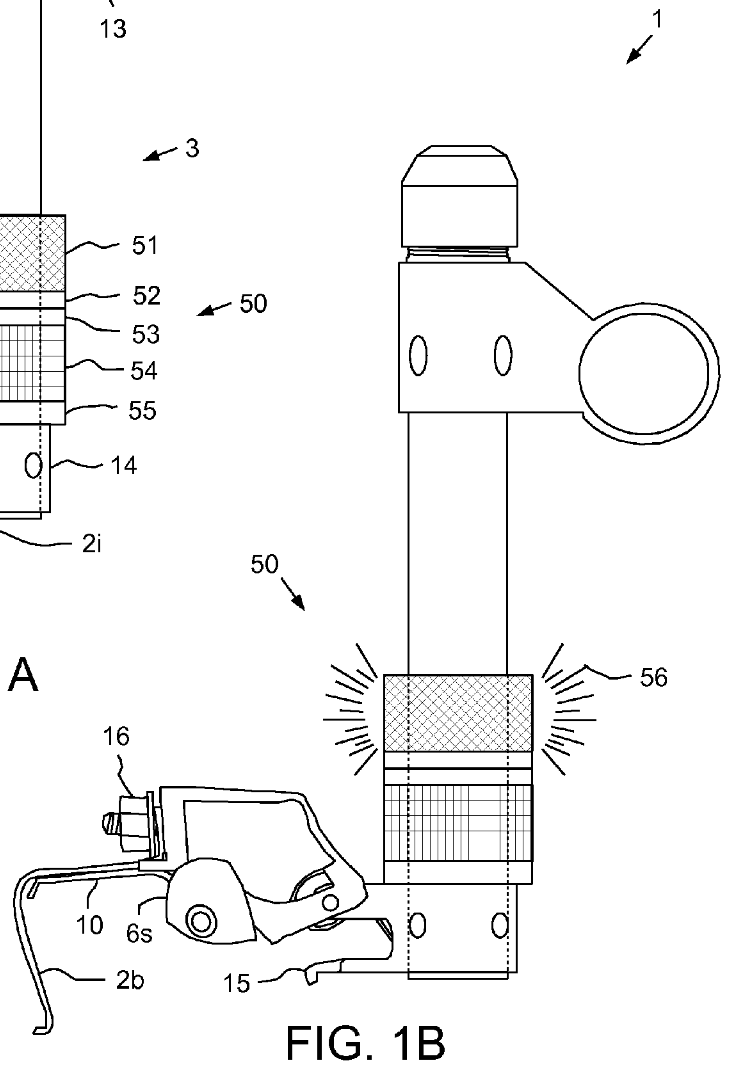
FIG. 1B is an external view of the fuseholder assembly in an open position.
Figure 2A:
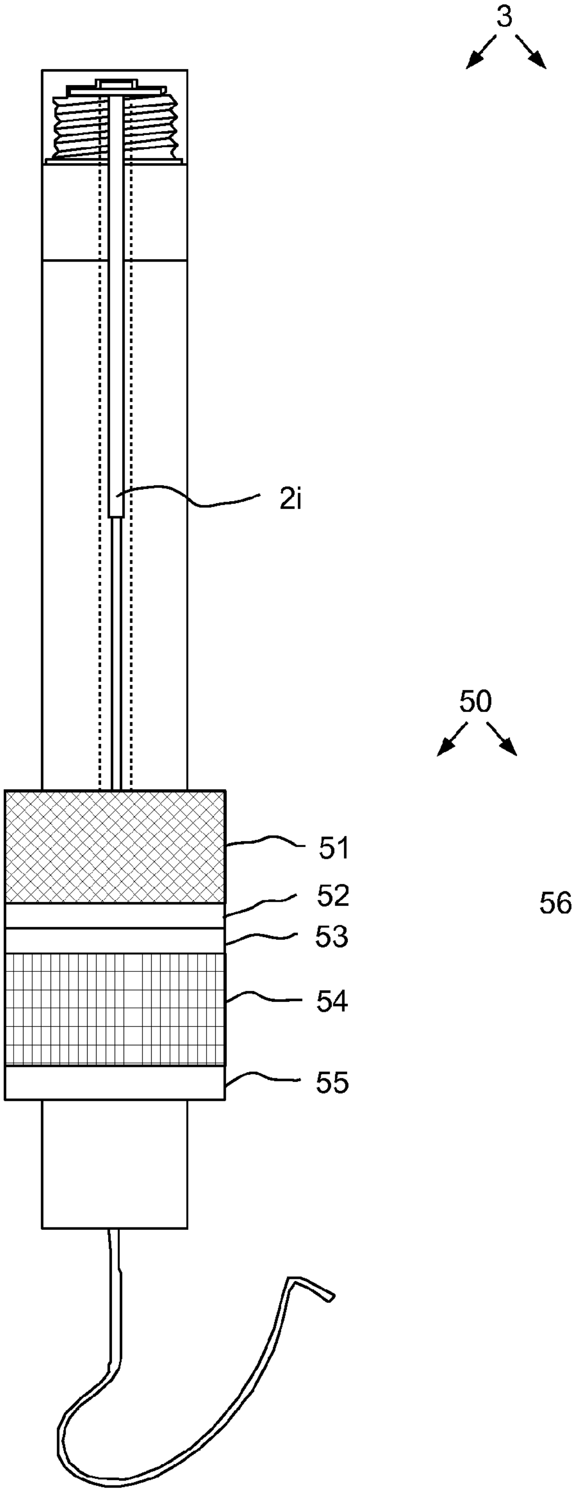
FIG. 2A illustrates an intact fuse of the fuseholder.
Figure 2B:
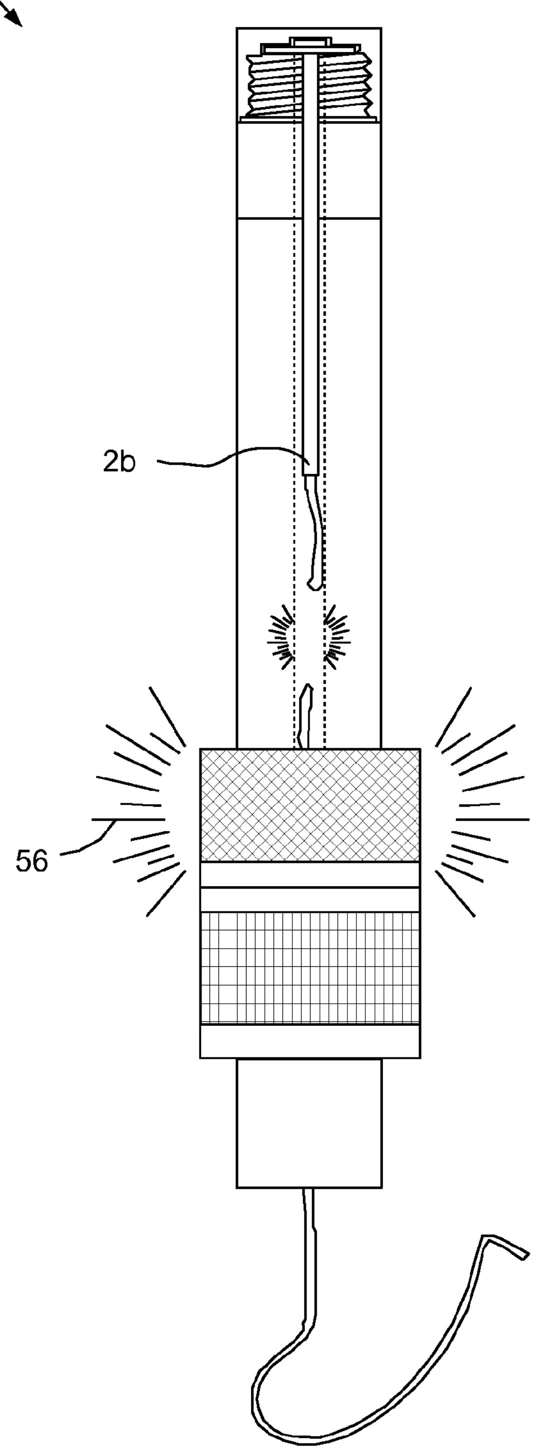
FIG. 2B is illustrates a blown fuse of the fuseholder.

FIG. 1A is an external view of a fuseholder assembly 1 in a closed position, according to one embodiment of the present invention. FIG. 1B is an external view of the fuseholder assembly 1 in an open position. FIG. 2A illustrates an intact fuse 2*i* of the fuseholder 3. FIG. 2B is illustrates a blown fuse 2*b* of a fuseholder 3.

A fuse cutout may include a mounting assembly (not shown) and the fuseholder assembly 1 supported by the mounting assembly. The fuse cutout may operate as a protective device for a power distribution system. Under normal conditions, the fuseholder assembly 1 may allow current to pass through the system. However, upon occurrence of an over current, the fuse cutout may act to interrupt the current flow. The fuseholder assembly 1 may be an expulsion type. The fuse 2*i* in the fuseholder assembly 1 may melt 2*b* allowing the fuseholder assembly to drop to the open position and then subsequently to drop to the drop-out position (not shown). The fuse cutout may be mounted to a system support, such as a pole (not shown), via the mounting assembly, and may be located within a conductor. The mounting assembly may include a mounting and a hinge. The fuseholder assembly 1 may include a trunnion 4, which may be received in the hinge once the mounting assembly is mounted, and the fuseholder 3 pivotally attached to trunnion.

The mounting may include a generally cylindrical one-piece porcelain insulator with a mounting member extending rearwardly therefrom for attachment to the system pole (not shown). Upper and lower support members (not shown) may extend from opposing ends of the insulator in a frontward direction. The upper support member may extend from a member (not shown) and include top and bottom surfaces. The top surface may be substantially planar and the bottom surface may form a channel such that the cross-section of upper support member may have a generally upside down U-shape. The upper support member may be made of galvanized or stainless steel.

A top contact (not shown) may be attached to the upper support member by a rivet (not shown) and extend downwardly from the bottom surface so that the top contact is disposed in the channel. The top contact may include a substantially planar portion having a bottom surface with a cavity formed therein. The cavity may extend upwardly into the channel and receive the fuseholder 3 when in the closed position. A guide portion (not shown) may be unitary with the planar portion and may extend slightly beyond the upper support member and be angled upwardly to provide self-aligning action during closing of the fuseholder 3. The top contact may be made of a highly conductive material, such as copper, and may be silver plated to resist corrosion. A biasing member (not shown) maybe disposed in the channel between the bottom surface and the top contact and may bias the top contact downwardly to maintain contact pressure on the fuseholder. The biasing member may be a stainless steel spring.

The upper support member may also include two steels hooks (not shown) connected at one end and attached to the bottom surface by a bracket (not shown). One end of the bracket may be attached to the upper support member and the opposing end may be attached to the hooks. The hooks may be spaced from one another such that the fuseholder may be easily received therebetween. The hooks may serve for connection to a load break tool (not shown) and may also serve as a guide for the fuseholder 3 upon its closing. The lower support member may have planar top and bottom surfaces and a central hole located near the end thereof for receiving a fastener (not shown), such as a bolt. The hinge may be attached to a bottom surface of the lower support member by a fastener (not shown). The lower support member may also be formed of galvanized or stainless steel.

The hinge may include two symmetrical parts joined at a rear end by a wall and open at a front end forming a gap between parts providing an inner receiving area for trunnion 4. Each hinge part may includes a substantially flat top plate, a rear plate extending downwardly from the rear edge of top plate, and an opposing front plate extending from the front edge of the top plate. The front plate may extend further than rear plate. An outward side plate may extend downwardly from the outer edge of the top plate such that side plates of each hinge part are facing outwardly and enclose the inner receiving area. Each side plate may have a substantially trapezoidal shape to match the differing lengths of the rear and front plates. Extending from the front plate of each hinge part may be a hook-type member that forms a deep U-shaped slot for receiving and providing a large pivot area for the trunnion 4. Slots may further allow the trunnion 4 to be easily inserted and removed from the hinge. The hinge may be made of a highly conductive material, such as copper, and may be plated with a corrosive resistant material.

Each hinge top plate may further include a lower contact having first and second end portions with a middle portion connecting the first and second end portions. The first end portion may be attached to a bottom surface of the top plate such that the first end portion is flush with the bottom surface. The middle portion may extend downwardly from the first end portion at an acute angle forming a generally L-shape with the first end portion. The second end portion may extend downwardly from the middle portion at an obtuse angle forming a central bend in the lower contact. Each lower contact may include a contact portion proximate the second end portion that engages the trunnion 4, thereby creating a current path. Each lower contact may be a unitary thin plate formed of a highly conductive material, such as copper, and may be plated to assure low resistance current transfer from the trunnion 4.

Parallel current paths may be created by each lower contact. These parallel current paths may be backed up by high strength cantilever springs that are also riveted to the hinge top plate. One cantilever spring may be disposed behind each lower contact and may have a shape conforming to the shape of the lower contacts. The cantilever springs may apply pressure on the rear surface of each lower contact near the second end portion to maintain the current path. Opposing upper and lower terminals may extend from the mounting. Both terminals may be tin-plated bronze terminals. The upper terminal may be connected to the upper support member by an upper bracket mated to the upper support member by a fastener. Similarly, the lower terminal may be mated to the lower support member by a lower bracket connected to the lower support member by the hinge-lower support member fastener with the rear end wall of the hinge being disposed between the bottom surface of lower support member and the top surface of the lower bracket.

The trunnion 4 may be pivotally attached to the fuseholder 3 with a biasing member (not shown) disposed therebetween, biasing the trunnion and the fuseholder together. Upon placing the trunnion 4 in the hinge of the mounting assembly, the biasing member may provide a mechanical assist in the actuation of the fuseholder 3 to the drop-out position. The biasing member may be a torsion spring. The trunnion 4 may include a trunnion body 5 having: a cam 6, a first pivot **7*f*, and first 8*f* and second 8*s* arms. The cam 6 may be an elongated member having opposing ends and a middle section extending therebetween, and its width sized to fit within the inner receiving area of the hinge, between the hinge parts. The cam 6 may be cylindrical to allow for smooth rotation with respect to the hinge. The cam 6 may include a rear planar cam surface 6*s* that may provide pressure relief for the lower contacts. At each opposing cam end, a pin may extend outwardly therefrom for engaging the hinge slots at a second pivot 7*s*, allowing the cam 6** to rest in the inner receiving area.

The first trunnion arm **8*f* may have a width substantially less than the width of the cam 6, and may extend from a front side of the cam at the middle section to the first pivot 7*f* to provide a rigid support therebetween. The first pivot 7*f* may have substantially the same width as the first arm 8*f* and may connect the body 5 to the fuseholder 3, such as by a pin received in a pinhole. The second arm 8*s* may extend from the first pivot 7*f* at an end opposite the first arm 8*f* and may meet a rear side of the cam 6 at the middle section, thereby forming a substantially D-shaped trunnion body 5 with an open inner area. The open inner area may allow a protective tool, such as a hot stick, to be inserted through the trunnion body 5 upon moving and operation of the fuseholder assembly 1. The second arm 8*s* may have a brace extending from the first pivot 7*f* and a rear wall extending downwardly at a generally right angle from the brace to the rear side of the cam 6. The second arm rear wall may have a width sized to accommodate a stud 9 attached to a planar rear surface of the rear wall portion. The fuse 2*i* may be connected to the trunnion 4 by wrapping a tail of the fuse around the stud 9 and tightening a crimp nut 16**.

The trunnion 4 may also include a link ejector 10 pinned thereto having a spring portion and a tab portion to ensure proper toggle action of the trunnion 4. The spring portion may act to bias the fuse **2*i* out of the fuseholder 3, thereby protecting the fuse cutout from burning up. An interlocking feature (not shown) between the link ejector 10 and the fuseholder 3 may prevent excess tension on the fuse 2*i*** during closure.

The fuseholder 3 may include an elongated fuse housing 11, such as a tube. The fuse housing 11 may be made of a dielectric material, such as fiberglass, and may be coated with an ultra-violet (UV) inhibitor. The fuseholder 3 may further include a cap 12 connected to the fuse housing 11 at an upper end thereof. The cap 12 may be formed of a highly conductive material, such as copper, and may be silver plated to provide efficient current transfer. The cap 12 may include a top portion for engaging the cavity of the upper contact of the upper support member when the fuseholder 3 is the closed position. The fuseholder 3 may further include a handle 13, such as a casting, having a pull ring extending therefrom in a frontward direction for opening and closing fuseholder with a disconnect tool. The handle 13 and the cap 12 may be connected, such as by a threaded connection. The fuse **2*i* may have a button head connected between the handle 13 and the cap 12**.

The fuseholder 3 may further include a lug 14, such as a casting, connected to a lower end thereof. The lug 14 may have a base and a pair of pivot extensions extending therefrom in a rearward direction for engaging the trunnion 4 at the first pivot **7*f*. Each pivot extension may include a pin hole for receiving the pivot pin. The pivot extensions may be spaced to allow the trunnion 4 to be inserted between the extensions such that the pivot pin hole aligns with the pivot extension pin holes. The pivot pin may then be inserted through the aligned pin holes to pivotally connect the trunnion 4 and the fuseholder 3. The torsion spring my then be inserted onto the pivot pin between one pivot extension and the trunnion 4 such that one end of the torsion spring engages the lug 14 and biases the fuseholder 3 in a counterclockwise direction and an opposing end of the torsion spring engages the second arm 8***s* and biases the trunnion 4 in a clockwise direction. The fuseholder 3 may also include a toggle latch 15 extending downwardly from the lug base. The toggle latch 15 may keep the fuse 2*i* from being over stressed when the fuseholder assembly 1 slams closed.

Figure 3A:
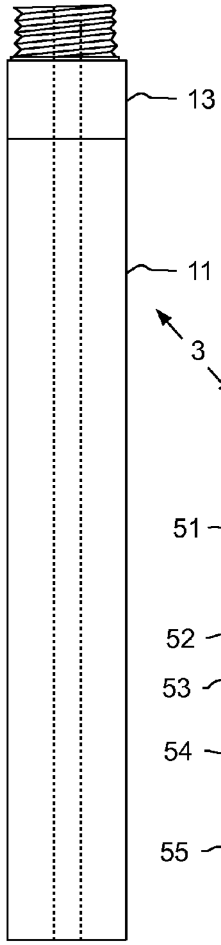
FIGS. 3A and 3B illustrate assembly of a fuse cutout indicator and the fuseholder.
Figure 3B:
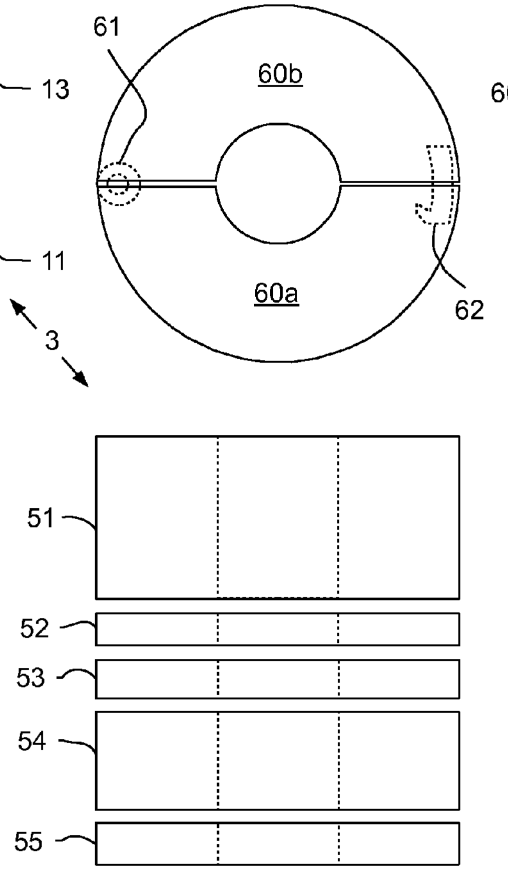
Figure 4A:
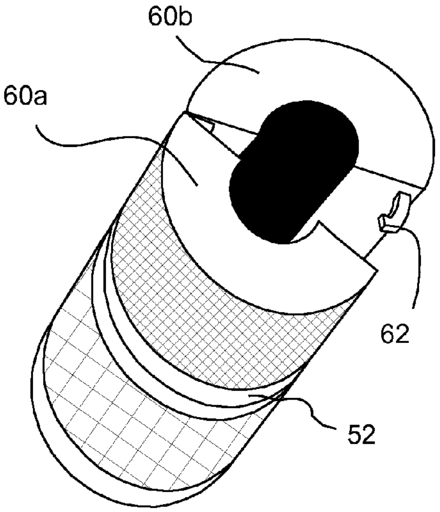
FIG. 4A illustrates the fuse cutout indicator in an unlatched position.
Figure 4B:
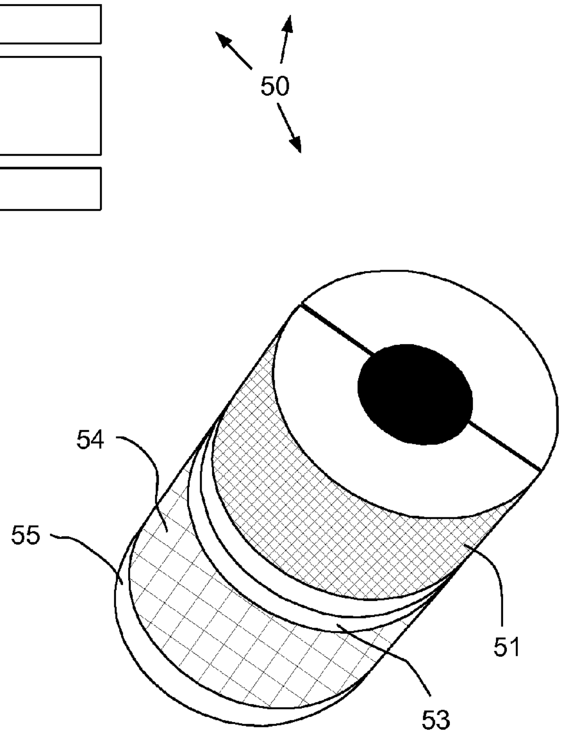
FIG. 4B illustrates the indicator in a latched position.

FIGS. 3A and 3B illustrate assembly of a fuse cutout indicator 50 and the fuseholder 3. FIG. 4A illustrates the fuse cutout indicator 50 in an unlatched position. FIG. 4B illustrates the indicator 50 in a latched position. The fuseholder 3 may further include the fuse cutout indicator 50. The indicator 50 may include an alarm 51, a power controller 52, a battery charger 53, a solar cell 54, and a battery pack 55. The indicator components 51-55 may be electrically connected by circuitry (not shown). Each indicator component 51-55 may include a first portion encapsulated in a first transparent semi-tubular shell 60*a* and a second portion encapsulated in a second semi-tubular shell 60*b*. Each shell 60*a,b* may be made from a transparent polymer (i.e., epoxy, polyurethane, shellac, or polyester). The transparent polymer may be UV resistant or coated with a transparent UV inhibitor. The indicator 50 may further include a hinge 61 pivotally connecting the two shells 60*a,b*, a latch 62, a latch profile (not shown), and an electrical coupling (not shown) for each indicator component 51-55. Each electrical coupling may include a pin and a socket. The latch 62 may be connected to the second shell 60*b* and the latch profile formed in the first shell 60*a* or vice versa. The second shell 60*b* may further include a latch release (not shown).

The indicator 50 may be retrofitted to the fuseholder assembly 1 by placing the unlatched indicator over the fuse housing 11 and bringing the latch 62 and latch profile ends of the shells 60*a,b* together by pivoting about the hinge 61 until the latch 62 engages the latch profile, thereby fastening the two shells together around the fuse housing. As the latch 62 is operated, the electrical couplings may also connect each component portion 51-55 together. The fuseholder assembly 1 may be taken out of service for the retrofit or the indicator 50 may be retrofitted while the fuseholder assembly is in service using a hot stick. The encapsulation process may be adjusted for various size fuse housings.

Alternatively, each component 51-55 may be separately encapsulated and the encapsulated components may be connected, such as by pins and sockets. In this alternative, the components 52-55 shell material need not be transparent. Alternatively, one or more of the indicator components may only be located in one of the shells 60*a,b*.

The alarm 51 may be a strobe light, such as a light emitting diode (LED) strobe light. The power controller 52 may include a microprocessor and a contactless power sensor, such as a Hall effect ammeter, in electrical communication with the fuse 2*i*. The power controller 52 may monitor high voltage alternating current (AC) (i.e., greater than or equal to five kilovolts) conducted through the fuse 2*b*. The battery charger 53 may receive low voltage direct current (DC) from the solar cell 54 (when exposed to sunlight) and may maintain charge in the battery pack 55 such that the battery pack may power the alarm 51 for a predetermined period of time, such as one week. The battery pack 55 may include one or more rechargeable batteries, such as lithium-ion batteries. The microprocessor may monitor the fuse 2*i* using the power sensor for interruption due to blowing of the fuse 2*b*. If interruption is detected, the power controller 52 may connect the battery pack 55 to the alarm 51, thereby operating the alarm 51 to discharge a flash of light 56 at a regular interval, thereby facilitating visual detection of the blown fuse by a service technician searching the area. The flash of light 56 may be white or colored, such as red.

Advantageously, the power controller 52 may distinguish between a blown fuse 2*b* in the fuseholder 3, and failure of the fuseholder assembly 1 drop due to unintentional welding of the cap to the upper contact even though the fuse has blown. Since the power controller 52 may detect an interruption in current using the power sensor, the power controller may activate the alarm in response to the situation where the fuseholder assembly 1 has dropped to the open or drop-out position and in response to a false negative situation where the fuseholder assembly fails to drop.

Alternatively, instead of or in addition to the strobe light, the alarm may include a transmitter and antenna (not shown) for transmitting a wireless distress signal, such as a radio frequency signal, to a mobile receiver of a service truck or a central command station. The distress signal may include a specific address identifying the indicator 50 such that the address may be cross referenced with a database to identify the location of the particular fuseholder assembly. The address may then be provided to the service technician to facilitate location of the particular fuseholder assembly. Alternatively, the distress signal may include global positioning coordinates detectable by a receiver in a service truck. The receiver may also include a global positioning system and be operable to guide the service truck to the particular fuseholder assembly.

Alternatively, the battery pack 55 and battery charger 53 may be omitted and the alarm 51 may be directly powered by the solar cell 54. Alternatively, the contactless power sensor may be an electrostatic voltmeter instead of an ammeter. Alternatively, the indicator 50 may include a power converter instead of the solar cell 54 and the power controller may include a wireless power coupling, such as an inductive or capacitive coupling, instead of the contactless power sensor. The power coupling may receive electricity from the high voltage AC conducted through the fuse, convert the electricity to a low voltage DC, and supply the low voltage DC to the battery charger 54. The microprocessor may monitor the fuse 2*i* using the power coupling/power converter for interruption due to blowing of the fuse 2*b*. Alternatively, the microprocessor may be omitted and the power sensor connected directly to an actuator of a switch, such as a solenoid.

Figures 5A, 5B, 5C:
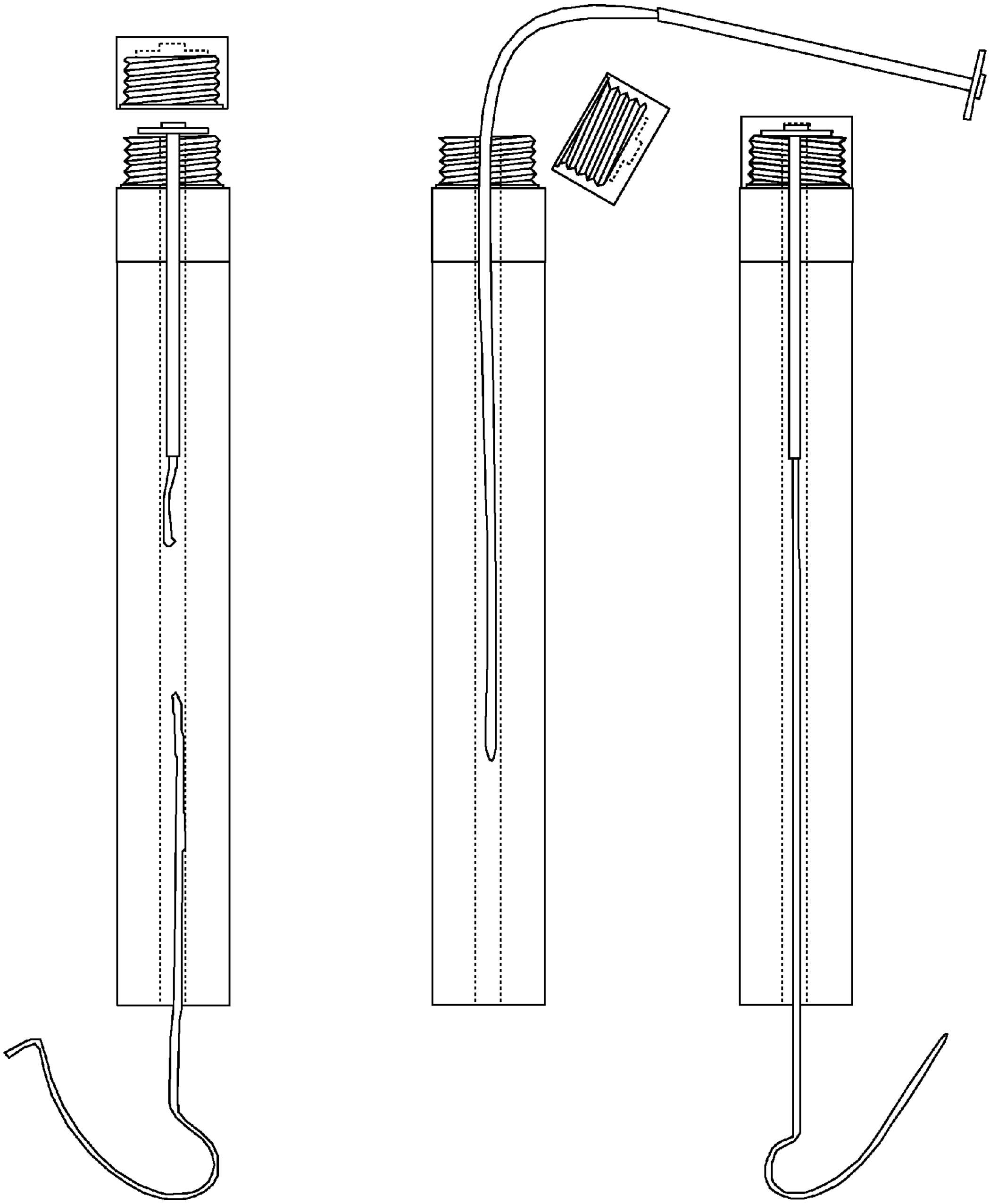
FIGS. 5A-5C illustrate a method of replacing a blown fuse of the fuseholder.

FIGS. 5A-5C illustrate a method of replacing the blown fuse 2*b* of the fuseholder 3. Upon closing fuseholder 3, the fuse cutout may then be operational as a protective device. The cap 12 may engage the upper contact when the fuseholder 3 is in the closed position. The trunnion 4 may concurrently be in a first position, such that the second pivot 7*s* is substantially lower than and nearly vertically aligned with the first pivot 7*f*. In addition, the contact portion of each lower contact of the hinge may engage the cam 6 with back-up springs applying a first pressure to lower contacts and the cam 6. Under normal conditions, the current may be allowed to travel through the fuse cutout when in its closed operative position. Specifically, the current may travel from a conductor to the upper terminal of mounting, through upper support member, through upper contact to the fuse 2*i* via the cap 12. The current may then travel through the fuse 2*i* to the stud 9, through the cam 6 to the parallel current paths created by lower contacts, through the hinge, and finally through the lower terminal.

Upon occurrence of an over current, the fuse 2*i* may melt 2*b*, thereby separating into an upper portion and a lower portion such that the trunnion 4 and the fuseholder 3 are no longer a rigid body. The trunnion 4 may then be allowed to rotate with respect to the hinge, dropping the fuseholder assembly 1 initially to an open position. The trunnion 4 may also drop to the open position where the second pivot 7*s* may only be slightly lower and substantially horizontally aligned with the first pivot 7*f*. Upon the trunnion 4 rotating at the second pivot 7*s* to the open position, the fuseholder 3 may be simultaneously rotated downwardly at the first pivot 7*f* to its open position, such that the cap 12 may be spaced from the upper contact, thereby creating a fault interruption. In addition, the link ejector 10 may act to force the fuse element 2*b* out of the fuse housing 11 to prevent burn up of the cutout, as the trunnion 4 rotates to its open position. Once the fuseholder assembly 1 has initially dropped to the open position, gravity may pull the fuseholder assembly to drop to the drop-out position. The trunnion 4 may rotate to the drop-out position, where the first pivot 7*f* may be below the second pivot 7*s*. The fuseholder 3 may simultaneously rotate to the drop-out position such that the fuse housing upper end and cap 12 are pointing downwardly. The link ejector 10 may then pull the blown fuse lower portion from the fuse housing 11.

The fuseholder assembly 1 may then be removed from the mounting assembly using a hot stick. The blown fuse upper portion may be removed from the fuse housing 11 by removing the cap 12. The blown fuse lower portion may be removed from the trunnion 4 by loosening the crimp nut 16. A new fuse 2*i* may then be inserted into the fuse housing 11 until the button head thereof abuts an upper end of the handle 13. The cap 12 may then be screwed onto the handle until the cap abuts the button head, thereby securing the fuse 2*i* in the fuse housing 11.

The spring portion of the link ejector 10 may be forced inward toward the fuseholder 3 to allow the fuse tail to be wrapped therealong. The fuse tail may then be wound around the stud 9, tightened, and secured by the crimp nut 16. The link ejector 10 may then be released, applying pressure on the fuse tail to ensure proper ejection of the lower portion of the blown fuse 2*b*. The fuseholder assembly 1 may then be ready to be received by the mounting assembly. The hot stick may be inserted through the trunnion 4 and the fuseholder assembly 1 may be placed in the mounting assembly by inserting the trunnion 4 in the hinge. The weight of the fuseholder assembly 1 may drop the fuseholder 3 to its full drop-out position. The Fuseholder 3 may be closed by inserting the hot stick into the pull ring of the handle 13 and rotating the fuseholder 3 to the closed position.

The power controller microprocessor may automatically deactivate the alarm 51 by disconnecting the alarm from the battery pack 55 in response to detecting restoration of current through the fuse 2*i*.

While the foregoing is directed to embodiments of the present invention, other and further embodiments of the invention may be devised without departing from the basic scope thereof, and the scope thereof is determined by the claims that follow.

The invention claimed is:

1. A fuse cutout indicator, comprising:

a battery pack;

an alarm;

a power controller:

having a contactless power sensor for communication with high voltage alternating current through a fuse, and operable to connect the alarm to the battery pack in response to cessation of the alternating current through or the high voltage across the fuse; and one or more shells housing the battery pack, alarm, and the power controller and having a cylindrical inner surface for mounting to a tubular housing of a pole mounted fuse cutout.

2. The indicator of claim 1, wherein the contactless sensor is an ammeter.

3. The indicator of claim 2, wherein the power controller is further operable to disconnect the alarm from battery pack in response to restoration of current through a replacement fuse.

4. The indicator of claim 1, wherein the alarm comprises a strobe light.

5. The indicator of claim 1, wherein the alarm comprises a transmitter and an antenna.

6. The indicator of claim 1, further comprising:

a solar cell; and a battery charger operable to be supplied by the solar cell and maintain charge of the battery pack.

7. The indicator of claim 1, wherein the one or more shells comprise:

two semi-tubular shells housing the battery pack, alarm, and the power controller;

a hinge pivotally connecting the shells; and a latch for fastening the shells together.

8. A fuseholder, comprising:

the indicator of claim 1; and the tubular housing made from a dielectric material and operable to receive a fuse, wherein the indicator is connected to the housing.

9. The fuseholder of claim 8, further comprising:

a handle connected to an upper end of the housing;

a cap connected to the handle and made from an electrically conductive material; and the fuse connected to the housing between the cap and the upper fitting.

10. A fuse cutout indicator, comprising:

a battery pack;

an alarm; and a power controller:

having a wireless power coupling for communication with high voltage alternating current conducted through a fuse, and operable connect the alarm to the battery pack in response to cessation of the alternating current through or the high voltage across the fuse;

a power converter operable to receive electricity from the wireless power coupling and supply low voltage direct current to the battery charger; and a battery charger operable maintain charge of the battery pack; and one more shells housing the battery pack, alarm, and the power controller and having a cylindrical inner surface for mounting to a tubular housing of a pole mounted fuse cutout.

* * * * *

UNITED STATES PATENT AND TRADEMARK OFFICE

CERTIFICATE OF CORRECTION

PATENT NO. : 9,099,270 B2
APPLICATION NO. : 13/367723
DATED : August 4, 2015
INVENTOR(S) : Terry L. Zulkowski It is certified that error appears in the above-identified patent and that said Letters Patent is hereby corrected as shown below:

Claims:

Column 8, Claim 1, Line 2, please insert --continuous-- after for;

Column 8, Claim 1, Line 3, please insert --conducted-- after current;

Column 8, Claim 3, Line 15, please insert --automatically-- after to;

Column 8, Claim 10, Line 46, please insert --continuous-- after for;

Column 8, Claim 10, Line 54, please delete "and";

Column 8, Claim 10, Line 57, please insert --or-- after one.

Signed and Sealed this
Fifth Day of January, 2016

Michelle K. Lee
*Director of the United States Patent and Trademark Office*